United States Patent
Trinkel et al.

(10) Patent No.: US 9,300,793 B2
(45) Date of Patent: Mar. 29, 2016

(54) PROVISION OF A PERSONALIZED INDICATOR DATUM WHEN SETTING UP A TELECOMMUNICATION

(75) Inventors: Marian Trinkel, Kreuzau (DE); Martin Eckert, Berlin (DE); Detlef Hardt, Hannover (DE); Frank Daussmann, Hassloch (DE)

(73) Assignee: DEUTSCHE TELEKOM AG, Bonn (DE)

( * ) Notice: Subject to any disclaimer, the term of this patent is extended or adjusted under 35 U.S.C. 154(b) by 1153 days.

(21) Appl. No.: 11/082,464

(22) Filed: Mar. 16, 2005

(65) Prior Publication Data

US 2005/0265532 A1 Dec. 1, 2005

(30) Foreign Application Priority Data

Mar. 16, 2004 (DE) .......................... 10 2004 013 861

(51) Int. Cl.
*H04M 3/42* (2006.01)
(52) U.S. Cl.
CPC ............ *H04M 3/42* (2013.01); *H04M 3/42042* (2013.01); *H04M 3/42093* (2013.01)
(58) Field of Classification Search
CPC .......... G06Q 30/0255; G06Q 30/0222; G06Q 30/0242; G06Q 30/0267; H04M 19/04; H04M 3/02; H04M 1/07; H04W 4/02; H04W 4/16
USPC ............................. 379/88.17, 142.01, 201.12
See application file for complete search history.

(56) References Cited

U.S. PATENT DOCUMENTS

| | | | | |
|---|---|---|---|---|
| 7,203,294 B2* | 4/2007 | Carnazza et al. | ......... | 379/142.07 |
| 7,603,108 B2* | 10/2009 | Sparks et al. | ............. | 455/414.1 |
| 7,729,487 B2* | 6/2010 | Koch | ....................... | 379/207.16 |
| 2002/0172338 A1* | 11/2002 | Lee et al. | ................. | 379/142.01 |
| 2003/0033526 A1* | 2/2003 | French et al. | ................. | 713/168 |
| 2003/0069716 A1* | 4/2003 | Martinez | ....................... | 702/188 |
| 2004/0114732 A1* | 6/2004 | Choe et al. | ................. | 379/88.17 |

* cited by examiner

*Primary Examiner* — Oleg Asanbayev
(74) *Attorney, Agent, or Firm* — Kenyon & Kenyon LLP

(57) ABSTRACT

A method and system which provide a personalized indicator datum on at least one terminal when establishing a telecommunication or when setting up a call between at least two terminals. In a first database, able to be accessed by an intelligent network of the network of the first terminal, an identification datum assigned to a first terminal is assigned the identification datum of at least one second terminal. And, as a function of the assignment, at least one indicator datum is stored in the first or a further database able to be accessed by the intelligent network of the TCN of the first terminal. When a call set-up is initiated between at least two terminals, in response to the identification datum of the first terminal, the intelligent network of the TCN of the first terminal compares the identification datum of the at least one further terminal with the identification datum of the at least one second terminal. In response to an assignment match, the indicator datum stored as a function of the assignment is called up and transmitted to at least one of the further terminals in accordance with the assignment.

5 Claims, 3 Drawing Sheets

PROVISION OF A PERSONALIZED INDICATOR DATUM WHEN SETTING UP A TELECOMMUNICATION

FIELD OF THE INVENTION

The present invention relates to a method and a system for providing a personalized indicator datum when setting up a telecommunication between at least two telecommunication terminal devices.

BACKGROUND INFORMATION the indicator datum of a telecommunication set-up or a call set-up between two telecommunication terminal devices may be implemented by a ring sign or signal tone or sequence, which is transmitted to the calling telecommunication terminal device of the caller in the form of a call-connected or busy signal, and/or to the called telecommunication terminal device of the called party as a call signal.

A call sign may be transmitted in that a central or a decentralized unit of a telecommunication network involved in setting up the call, for instance, an exchange unit in the case of a fixed network, transmits a control or signaling signal to the called telecommunication terminal on a control or signaling channel, thereby triggering an acoustical signal device such as an alarm or a bell assigned to the particular telecommunications terminal called. In newer telecommunication terminal devices, including wireless telecommunication terminal devices, for instance, the signal tone or ring tone may be selected or modified with the aid of software implemented in the telecommunication terminal device, or it may also be modified individually via software to be called up from a provider.

A call-connected signal or busy signal is usually transmitted to the calling telecommunication terminal device by way of a signal tone routed to a basic channel such as a voice channel.

The European patent EP 0 813 787 B1 purportedly relates to a telephone device with a caller-specific call signal. The called telephone device includes means for generating a call-signal tone as a function of signaling information, relating to the identity of the caller, received by the telephone device called. Thus, a personalized, caller-specific ring sign is generated in the called telephone device, based on signaling information assigned to the caller. For instance, it is possible to set a specific tone at the called telephone as a function of each digit of a received call participant or subscriber number, and to produce it subsequently.

Furthermore, in the called-up telephone device, a specific tone may also be assigned to certain calling telephone numbers or to a certain group of calling telephone numbers. The call or signal sign at the called telephone device may also be indicated by displaying the name of the calling party, the name stored under a telephone number, or it is able to be indicated in the form of a voice signal.

In this case, the corresponding preselection and activation of a particular call indicator datum is tied directly to the called telephone device.

German patent reference DE 100 52 932 A1 purportedly refers to a method for selecting a call signal that signals the wish of a calling telecommunication device to be connected to a called telecommunication device, the call signal being determined by the caller calling the dialed telecommunication device. The call signal is stored in the calling telecommunication device and transmitted by this device to the dialed telecommunication device together with a data record initiating the connection set-up. To reduce the loading of the memory of the calling telecommunication device, a call signal, defined by the dialer, is stored in the dialed telecommunication device or on the server of the network provider after its transmission, so that the dialing communication device subsequently transmits to the dialed telecommunication device or the server a data record which initiates the connection set-up and includes an identification that is unambiguously assigned to the call signal as address, whereupon the call signal is activated at the selected telecommunication device or is transmitted from the server to the dialed telecommunication device.

The corresponding preselection, transmission and activation of a particular call indicator datum is in this case tied directly to the calling telephone device.

A similar method is purportedly referred to in German patent reference DE 100 23 474 A1, in which, when sending out a call, at least one recognition signal describing a recognition sign is transmitted from a call-communication device to the called communication device, and the recognition sign is output by the called communication device in response to the recognition signal.

In the two aforementioned publications, the call indicator datum in each case must be adapted to the device called up for the display.

German patent reference DE 44 16 384 C2 purportedly refers to a method for an acoustic identification of a telephone caller in which, instead of the ring signal, the caller's telephone number is reproduced in acoustically encoded form as tone sequence via the loudspeaker of the called telephone.

In this method, too, the control and conversion mechanisms are directly integrated in a terminal device.

Priority German patent application DE 102004013861.3 is hereby incorporated herein in its entirety.

SUMMARY OF THE INVENTION

The present invention provides an approach for ensuring the provision of a personalized indicator datum when setting up a call between at least two telecommunication terminal devices, in particular, virtually independently of the individual telecommunication terminal devices utilized.

For the following description, the term "telecommunication terminal device" hereinafter will be referred to as terminal for the sake of simplification, and, without further specification, essentially includes any terminal device capable of voice and/or data transmission via a telecommunication network, i.e., especially wire-bound and wireless telephones, telephones assigned to a fixed network or mobile radio communication network, but also fax devices, PDA's (Personal Digital Assistant), MDA's (Multimedia Digital Assistant) including WAP (Wireless Access Protocol)-capable terminals and computers provided with corresponding software.

To provide a personalized indicator datum on at least one terminal when setting up a call between at least two terminals, embodiments of the present invention provide that, in a first database, able to be accessed by an intelligent network connected at least to the telecommunication network of the first terminal, an identification datum, able to be assigned to a first terminal, is assigned an identification datum able to be assigned to at least one second terminal. As a function of this assignment, at least one indicator datum is stored in the first or an additional database able to be accessed by the intelligent network. When initiating a call set-up between at least two terminals, in response to the identification datum of the first terminal, the intelligent network compares the identification datum of the at least one additional terminal with the identification datum, assigned in the database, of the at least one second terminal and, in response to an assignment match. The identification datum stored as a function of the assignment is called up and forwarded to at least one of the additional terminals in accordance with the assignment.

The storage, activation, and transmission of a personalized indicator datum is ensured essentially independently of the individual terminal, i.e., a personalized indicator datum is able to be utilized, in particular independently of the types, storage capacities, and/or functionalities of the individual terminals, and thus also with terminals, for instance, that no longer conform to the individual current standard.

For the assignment of the identification data of first and second terminals and/or for the selection of an indicator datum, a system is thus expediently provided, which includes a user interface able to be accessed by a terminal via a telecommunication network, and which cooperates with at least one intelligent network connected to the telecommunication network of the first terminal and at least one database, which is able to be accessed by the intelligent network, for assigning an identification datum of the at least one second terminal to an identification datum of the first terminal, and for storing at least one indicator datum as a function of the assignment. This is done in such a way that, during initiation of a call set-up between at least two terminal devices, in response to the identification datum of the first terminal, the intelligent network brings about the comparison of the identification datum of the at least one additional terminal with the assigned identification datum of the at least one second terminal device, and, in response to an assignment match, implements the call-up of the indicator datum, stored as a function of the assignment, and its transmission to at least one of the additional terminals in accordance with the assignment.

For example, if the terminal by which the access is carried out via the user interface does not correspond to the first terminal on the basis of whose assignment and as a function of which the personalized indicator datum is to be provided, a further identification and/or authentication procedure is additionally implemented in an application-specific manner for the purpose of authorizing the provision. To this end, a datum concerning the individual user connection or registered user is accessed, for instance by corresponding input via the user interface or by reading out data embedded in the identification datum and/or stored in an accessible database, utilizing a verification device which is part of the system.

According to another embodiment of the present invention, the identification datum of the at least one second terminal is assigned as identification datum of a called terminal to the identification datum of the first terminal as calling terminal. And, as a result, the at least one indicator datum is stored as a function of the assignment as indicator datum for the at least one second terminal as called terminal.

Further embodiments of the present invention provide for assigning the identification datum of the at least one second terminal as identification datum of a calling terminal to the identification datum of the first terminal as called terminal and, as a result, storing the at least one indicator datum as a function of the assignment as indicator datum for the at least one second terminal as calling terminal.

Therefore, at least one individual call datum is able to be provided basically for each terminal and independently of such a terminal, which, during the call set-up, in each case is indicated to a particular called second terminal, to a group of called second terminals or also to each second terminal called by the terminal. It is likewise possible to provide at least one individual call-connected and/or busy datum for essentially each terminal and independently of such a terminal, which is indicated to a particular calling second terminal, a group of calling second terminals or also to each second terminal calling the terminal when setting up the call.

Since at present a virtually complete detection of the individual types of terminals is possible already, for example, on the basis of the respective identification data, for instance based on a CLI (Call Line Identification), an IP address or an HLR (Home Location Register), in addition it is expediently provided that an interaction of the intelligent network with an intelligent periphery of the network is controlled in such a way that a verification of the indicator functionality and possibly an individually and correspondingly adapted conversion and/or encoding of the indicator datum is carried out prior to the storing or forwarding of the call-connected, busy and/or call datum personalizing the first terminal.

For example, in the case of terminals based on the latest state of technology, it is provided to transmit the indicator datum to the particular second terminal in the form of a software data record, for instance, and to adapt an indicator datum pre-implemented in the memory for the indication of the personalized indicator datum in a corresponding manner.

As a result, a multitude of individual indicator data is able to be provided, such as sounds, images, sound, voice and/or image sequences, and data which is based on SMS and/or email. It is therefore also possible to ensure a large-scale alarm in a simple manner via specific terminals.

For instance, such a mass alarm may be provided in the event of a dangerous situation affecting at least part of the population. To warn or inform the affected population groups, residents of a community or region in a selective manner, the lines of terminals assigned to the corresponding population groups, the community or the region may be called via their individual network identifications and, depending on the situation at hand, individually provided indicator data is able to be transmitted. A large-scale alarm provided especially for the purpose of notifying everybody, is therefore able to be triggered, preferably by public agencies or by rescue centers appointed for this purpose.

Embodiments of the system according to the present invention are configured in such a way that, as a function of the assignment, it sets a so-called "trigger detection point", or TDP, in the network connection of the first terminal personalizing the indicator datum, for example, such that, depending on the trigger detection point set, an exchange unit assigned to the telecommunication network of the first terminal responds to it when the call from or to the first terminal is set up, and implements a query to the intelligent network. If the stored assignment matches and if the second terminal is the calling terminal, a transmission channel of the second terminal for the reception of the stored individual indicator datum at the second terminal, and/or if the second terminal is the called terminal, a transmission channel thereof for the transmission of the indicator datum to the second terminal, is/are rerouted to an intelligent periphery cooperating with the individual database in which the indicator datum personalizing the first terminal is stored.

When it is the second terminal that is calling, the basic channel is utilized as transmission channel. In the case of a called second terminal, especially a signaling or control channel initiating the call set-up is rerouted accordingly. However, the use of signaling, control or basic channels for the transmission or forwarding of the indicator datum may also be implemented in reverse. In an application-specific manner, or as a function of a particular network usage, it is also possible to provide a joint or alternating use of signaling and basic channels for the transmission of an indicator datum.

Further embodiments of the present invention provide for the integration of a voice-guided and/or a graphic user interface for a simplified assignment and selection of an individual terminal and/or an individual indicator datum. The user interface may give the participant access to a portal via which already predefined indicator data, acoustic data including voice-based and/or optical data including image-based data, are able to be chosen from selectable lists, depending on the utilized terminal device, and/or are able to be individually compiled or stored. Access to lists for the individual selection and/or assignment of certain participant connections also may be provided via such a portal. To this end, the portal may be connected to the Internet and/or it has a user interface connected to the Internet.

In further embodiments, at least one processing unit connected to the system generates, for further processing, a billing data record as a function of the indicator data, the identification datum of the first terminal and/or the identification datum of the at least one second terminal, the billing data record being assignable to the first terminal, for example, for billing purposes.

The units for implementing the method according to the present invention, for example, the intelligent network of the telecommunication network of the first terminal, the databases and intelligent peripheries, triggered by the system of the present invention for the purpose of cooperation, may be arranged in each exchange unit in an application-specific manner, especially specific to the telecommunication network, or they may be arranged in a decentralized manner interconnected via a central logic.

DETAILED DESCRIPTION

Figure 1:
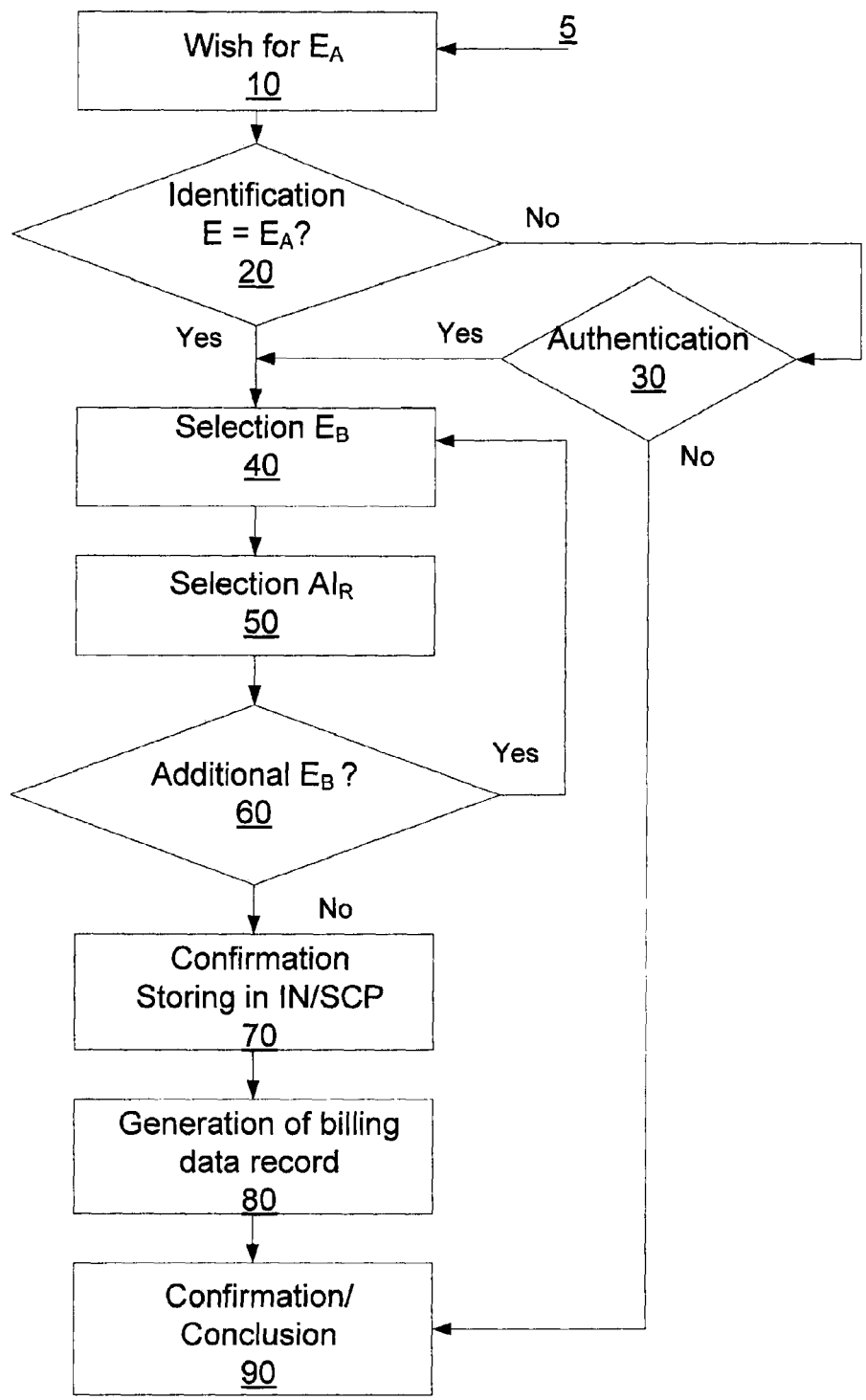
FIG. 1 shows a flow chart illustrating a sequence of an initialization of the provision of a personalized indicator datum, initiated by a user of the present invention via a user interface.

FIG. 1 shows a flow chart illustrating a sequence of an initialization of the provision of a personalized indicator datum, initiated by a user of the present invention via a user interface. For the detailed exemplified description, it should basically be assumed that user $N_A$ has a terminal $E_A$, which is assigned to a specific user line of a home-telecommunication network $T_A$, on the basis of which the provision of a personalized indicator datum for a corresponding indication on a terminal $E_B$ of a user B of the same or some other telecommunication network is to be implemented. It should be noted that the home-telecommunication network essentially also encompasses any type of communication network and may be configured, for instance, as central network or decentralized network, as public or local network.

Furthermore, it should be assumed that terminal $E_A$ generates a ring tone A at a dialed terminal $E_B$ as a function of dialed terminal $E_B$, but user $N_A$ would like an individual calling tone $AI_R$ as a function of terminal $E_B$ called in each case.

Via a terminal, using a corresponding call number, user $N_A$, via a user interface, dials into 5 a portal provided according to the present invention, where he expresses this wish for his terminal $E_A$ 10.

When dialing into the portal, or also perhaps only at a later point in time, yet no later than upon confirmation of the desired function, an identification 20 of the terminal as terminal $E_A$ is implemented, for instance via the CLI also transmitted during the call set-up. If the terminal does not correspond to terminal $E_A$, it is possible to check the authorization of terminal $E_A$ with the aid of a specific authentication routine 30. If the terminal cannot be authenticated as terminal $E_A$, then the sequence is concluded 90.

Upon identification or authentication, the portal provides user A with an application-specific menu depending on the utilized interface, for instance with the assistance of a voice-guided computer.

User A selects a desired participant B by keyboard or voice input of the call number of terminal $E_B$ 40 of participant B, and defines terminal $E_B$ as the terminal to be called.

User A then selects, for instance from a provided list 50, an individual calling tone $AI_R$ which is to be indicated on terminal $E_B$ when terminal $E_A$ is calling.

If additional terminals are to be assigned to terminal $E_A$ for an individual indicator datum 60, the steps are repeated correspondingly. If user A wants a calling tone $AI_R$ he selected to be used for all called participants, this is implemented, for instance, by defining called terminal B as an undefined terminal B.

The assignment(s), including desired indicator data, i.e., in the case at hand, selected calling tone $AI_R$, in response to a confirmation 70 by user A, is/are transmitted to network $T_A$ of terminal $E_A$ via the portal and stored at a location in the intelligent network of network $T_A$, for instance, in a service control point provided for this purpose, a so-called SCP (service control point), which may be part of an exchange unit of network $T_A$.

In a following step, a data record assigned to user A or the user line of terminal $E_A$ is generated 80 for billing purposes, for instance based on the CLI of user A and the selected function.

After renewed confirmation 90 by user A, the operation is concluded, and user A leaves the portal or, if applicable, may utilize another function of the portal.

In the case at hand, user A, when using his terminal $E_A$ to call his specified participant B, the group of participants B or also any other participants B, thus has ring tone $AI_R$ he selected at the individual terminal $E_B$ of called participant(s) B. The following implementation, for instance, is conceivable in this context.

If user A calls the call number of terminal $E_B$, the intelligent network of home-telecommunication network $T_A$ of user A, on the basis of the CLI of terminal $E_A$, initially detects that a specific indicator datum is to be transmitted. The intelligent network thereupon compares the called CLI with the CLI's stored under the CLI of terminal $E_A$ and, in the case at hand, determines that specific calling tone $AI_R$ is to be transmitted to the call number of terminal $E_B$.

If the specific calling tone $AI_R$ is stored in the form of a software data record, for instance, the intelligent network causes the corresponding software data record to be read out, and sends the software data record to the user connection of terminal $E_B$ via the control channel. The software data record thereupon inserts itself into the hardware or the memory of terminal device $E_B$, is activated there and resets the configuration of the ring tones at terminal $E_B$ correspondingly for the activation of the individual call-indicator datum $AI_R$ selected by user A. As a result, it is not a ring tone set by participant B that is indicated to participant B via his terminal $E_B$, but the preselected individual calling tone $AI_R$ preselected by user A.

It should be noted that instead of a simple ring tone, it is also possible to select a sound sequence, frequency spectrums, text and/or images or image sequences. The selection of the personalized call-indicator datum depends, for instance, on the type of terminal via which user A is able to access which user interface and/or which portal.

In an application-specific manner, it is thus also possible to select SMS messages or voice-based messages. Since the indication of an individual indicator datum on a terminal may also depend on the type of terminal, it is provided that an intelligent periphery be assigned to the intelligent network, which, on the basis of the CLI or some other identifying datum of the terminal on which the individual indicator datum is to be indicated, converts and/or encodes the indicator datum in accordance with an indicator functionality of this terminal. For instance, if the selected indicator datum is SMS-based and the selected terminal a fax device, the SMS data record is converted in accordance with the protocol for a fax device. On the other hand, the present invention also makes it possible for an SMS message to be converted into a data record, for instance, which causes a corresponding voice message to be output at the selected terminal device.

Such an adaptation or a corresponding indication may also already be integrated in the sequence described according to FIG. 1.

A large-scale alarm, for instance, with the aid of a calling terminal device $E_A$ assigned to a disaster prevention organization, is thus able to be realized in a simple manner in that a broadcast is initiated to any number of terminals $E_B$, and an individual indicator datum, to be predefined only once, has been specified in advance, so that each called participant knows immediately that an exceptional situation is at hand.

Figure 2:
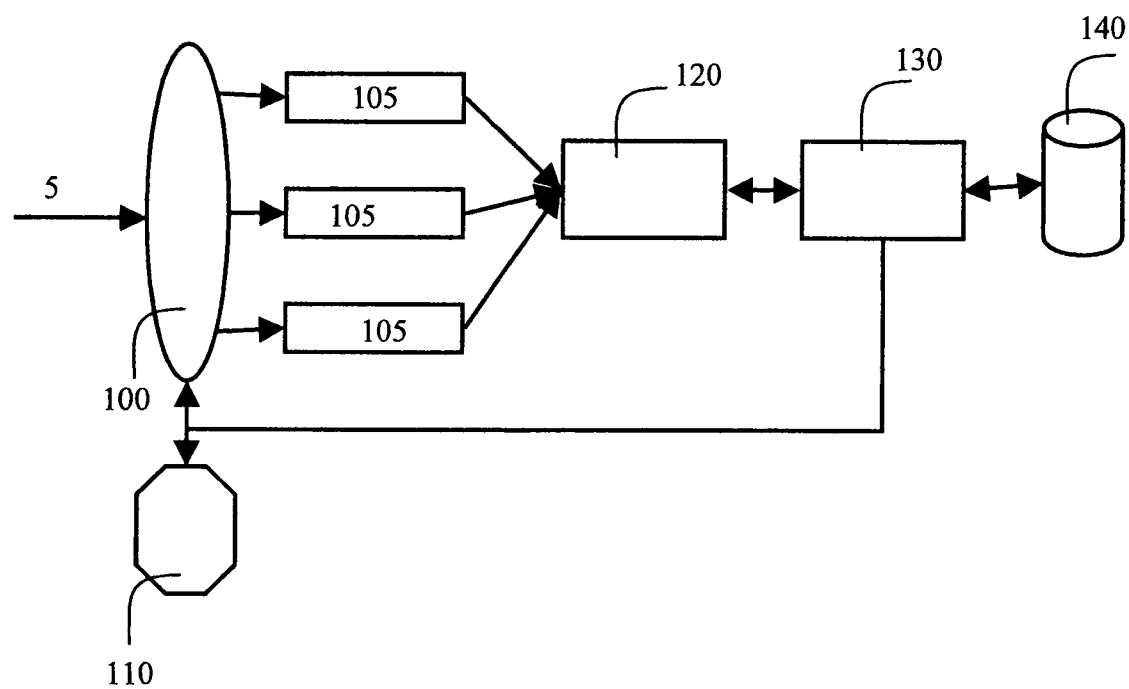
FIG. 2 shows a block diagram concerning the integration of the system according to the present invention in an existing telecommunication network.

FIG. 2 shows a schematic block diagram concerning an integration of the aforedescribed system according to the present invention in an existing telecommunication network.

Shown is a telecommunication network 100, for instance, a fixed network, which, however, may just as well be a mobile telecommunication network or the Internet. Together with network 100, various types of interfaces 105 are provided depending on the terminal device, via which the personalization of an indicator datum is implemented, the interfaces in turn being assigned to a portal 120. A user, dialing in 5 via network 100, therefore gains access to portal 120 by way of one of the user interfaces 105. Post-connected and assigned to portal 120 is also a central control 130, which expediently allows a bidirectional exchange of data between central control 130 and portal 120 and also a bidirectional exchange with at least one database 140. Furthermore, central control 130 is connected to telecommunication network 100, directly or indirectly, so as to ultimately allow the interaction of all units involved in implementing the method according to the present invention. For example, the aforedescribed authentication routine may also be implemented via the central control and/or a query to another telecommunication network be effected via network 100.

Depending on the terminal used for access 5, the terminal device for which an indicator datum is to be provided and/or the terminal device on which the individual indicator datum is to be indicated, it is thus possible to access, assign or store the individual identification data. Therefore, a CLI, an IP address, IMEI/IMSI (International Mobile Equipment Identity/Internatinal Mobile Subscriber Identity), for instance, and/or a datum from a home network-related register, for example an HLR in the case of a GSM-based mobile communication device, are used as identification datum.

However, the network-based individual provision of an indicator datum assigned to a terminal device $E_A$ according to the present invention not only makes it possible to implement a personalized indicator datum of a calling terminal $E_A$ on a called terminal $E_B$, but also to forward a personalized indicator datum of a called terminal $E_A$ to a calling terminal $E_B$, which will be described with the aid of FIG. 3 by way of example.

However, it should be mentioned, first of all, that the effects of the interrelationships indicated hereinafter on the basis of FIG. 3, upon corresponding adaptation, are essentially also utilizable for the personalized indication of a calling terminal device $E_A$ on a called terminal device $E_B$.

Figure 3:
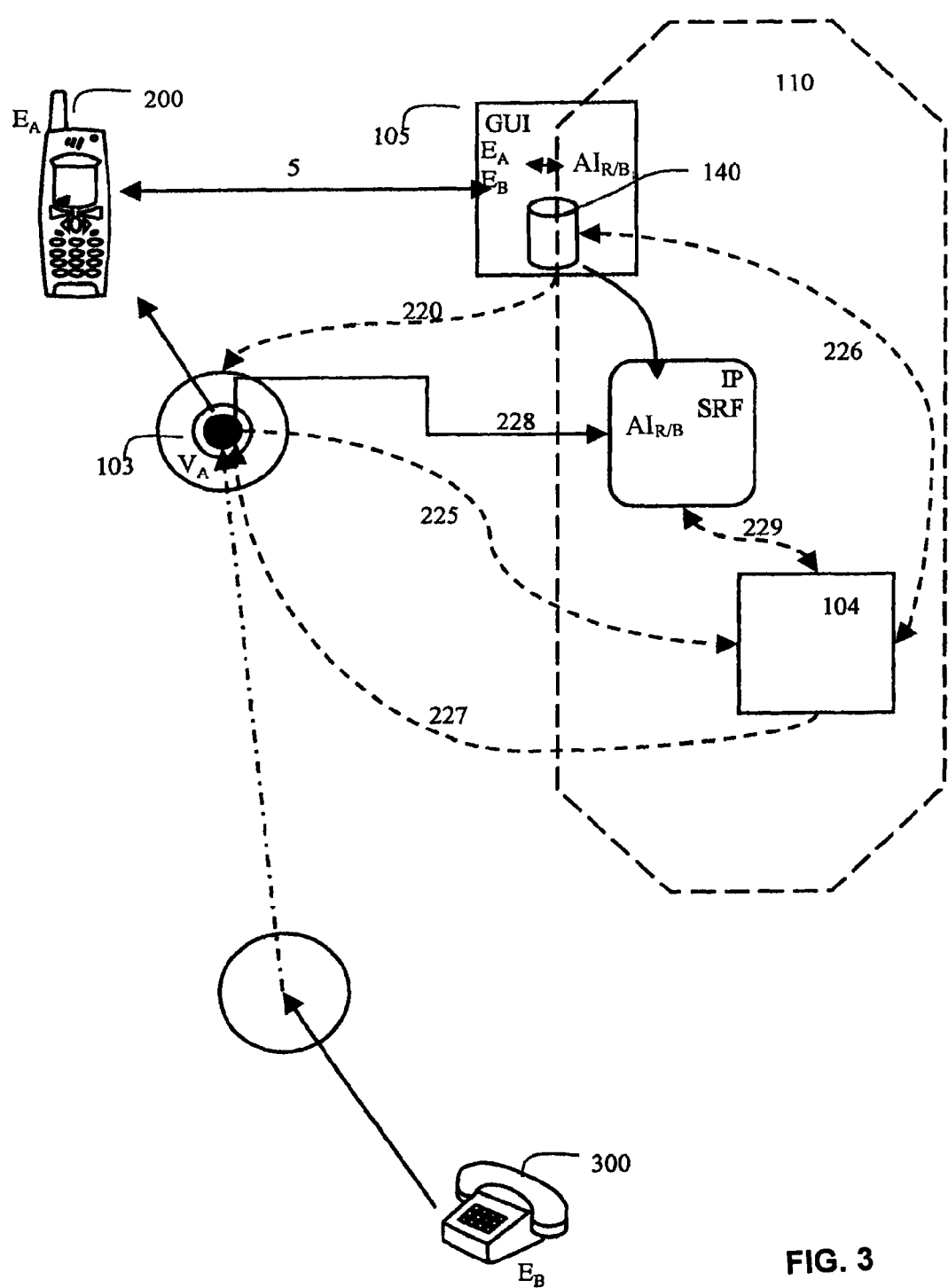
FIG. 3 shows a schematic block diagram concerning the effective interrelationships of individual units involved in the implementation of the method according to the present invention.

According to FIG. 3 (at ref. 5), a user A, by way of his terminal device 200, $E_A$, inputs content specified as individual call-connected/busy indicator data $AI_{R/B}$ via a graphic user interface 105, GUI, which is directly or indirectly connected to intelligent network 110, such input being implemented either by selecting from corresponding lists which are able to be called up via user interface 105 or, for instance, by uploading of contents $AI_R$/B stored in his terminal device $E_A$, user A assigning the identification datum of terminal devices 300, $E_B$ of certain selected callers to his terminal device 200, $E_A$ to this end. Of course, a method as described according to FIG. 1 is suitable for this purpose as well.

According to FIG. 3, the identification data, their assignment and dependencies are stored in a first database 140 assigned to user interface 105 and/or a portal assigned to the user interface. Individual content $AI_{R/B}$ selected via terminal $E_A$ is stored in an intelligent periphery IP of intelligent network 110 in the form of data files, for instance within a so-called specialized resource functional unit SRF (Special Resource Function). Furthermore, a trigger detection point, preferably already related to an individual call-connected and/or busy signal, is set for the user line of participant A via intelligent network 110, that is to say, in particular in an exchange unit 103, $V_A$ of his home telecommunication network, this being indicated in FIG. 3 by the slashed arrow denoted by 220.

If such a detection point is crossed in establishing a call, trigger conditions are analyzed and actions implemented, if applicable. To implement actions based on trigger conditions, messages are usually sent in the exchange unit to corresponding components of the intelligent network, which then execute the particular action.

In the case at hand, an individual call-connected signal, for instance, is to be indicated to one or several or also all calling terminal device(s) 300, $E_B$.

If terminal 300, $E_B$ sets up a call to terminal 200, $E_A$, the call set-up is initiated via a first exchange unit VB assigned to participant B, extending up to exchange unit 103, $V_A$ correspondingly associated with the user connection of terminal 200, $E_A$. Exchange unit 103, $V_A$ responds to the trigger detection point and transmits a query to a logic unit 104 of intelligent network 110, indicated in FIG. 3 by the dashed arrow denoted by 225, inquiring whether a certain action, i.e., in the case at hand, the return transmission of an individual call-connected or busy signal, depending on the state of terminal 200, $E_A$, is to be transmitted to terminal 300 $E_B$. Logic 104 of intelligent network 110 thereupon verifies terminal 300, $E_B$ as a terminal correspondingly assigned to terminal 200, $E_A$, indicated in FIG. 3 by dashed arrow 226, and, in a next step, instructs exchange unit 103, $V_A$ to route the voice channel of terminal 300, $E_B$ to the corresponding input port of intelligent periphery IP (arrow 228 in FIG. 3) where the individual indicator datum $AI_R/B$ intended for terminal 300, $E_B$ and to be transmitted back, is stored. In parallel thereto, exchange unit 103, $V_A$ applies the call sign in the direction terminal 200, $E_A$.

The call sign may also be an individual indicator datum previously assigned to terminal 300, $E_B$.

If terminal device 200, $E_A$ is busy, exchange unit 103, $V_A$ informs intelligent logic 104 to that effect, intelligent logic 104 thereupon instructing intelligent periphery IP to replay the individual busy datum. If terminal device 200, $E_A$ is idle, intelligent network logic 104 correspondingly instructs intelligent periphery IP to play the stored individual call-connected datum.

In a modification, only in response to a call-connected or busy signal, the instruction of network logic 104 to exchange unit 103, $V_A$ may, for instance, also include to already route the voice channel of terminal device 300, $E_B$ to an input port of intelligent periphery IP, so that the correct file is transmitted directly. If no distinction is made between call-connected and busy datum, the individual indicator datum also may be transmitted back immediately.

If participant A wants to accept the call and picks up the receiver, this is indicated to the intelligent network in an appropriate manner via exchange unit 103, $V_A$, whereupon network logic 104 outputs 'call-complete', the connection to intelligent periphery IP is interrupted and the connection between terminals $E_A$ and 300, $E_B$ is established.

The functionalities involved in the exemplary description of a method according to the present invention may be arranged in each exchange unit, i.e., in the case at hand, in each exchange unit, or may be arranged in a central manner, possibly with components that are connectable in a decentralized manner.

The present invention therefore allows a forward-directed, personalized individual indicator datum, i.e., from a specific calling terminal to one or several called terminal(s), and/or a backward-directed, personalized individual indicator datum, i.e., based on a particular called terminal to one or several calling terminal(s).

What is claimed is:

1. A system for providing a personalized indicator datum on a first terminal when setting up a call between the first terminal and at least one second terminal, comprising:
    at least one user interface associated with at least one database of an intelligent network of a telecommunication network of the first terminal, wherein the at least one user interface is accessed via the first terminal, wherein the at least one user interface forms at least one of a graphics and a voice-guided user interface,
    wherein at least one identification datum assigned to the at least one second terminal is assigned to an identification datum of the first terminal at the at least one database; and as a function of the assignment, at least one indicator datum previously selected by the first terminal is stored at the at least one database,
    an application portal, accessible via the at least one user interface of the first terminal, implements:
        the identification datum of the at least one second terminal, as the identification datum of the called terminal, is assigned to the identification datum of the first terminal, as the calling terminal, in at least one database; and
        the at least one indicator datum as the function of the assignment is stored as the indicator datum for the second terminal as the called terminal,
        the identification datum of the at least one second terminal, as the identification datum of the calling terminal, is assigned to the identification datum of the first terminal as the called terminal in a first database; and
        the at least one indicator datum as the function of the assignment is stored as indicator datum for the second terminal as the calling terminal;
    as the function of the assignment, setting a trigger data point for a user line of the first terminal;
    wherein in response to the set trigger detection point, an exchange unit of the telecommunication network reroutes a transmission channel of the second terminal for the transmission of the indicator datum to the second terminal to an intelligent periphery of the intellgent network cooperating with the database in which the indicator datum is stored;
    the intelligent periphery cooperating with the intelligent network, and an exchange unit, which responds to a set Telocator Data Protocol (TDP) and, in cooperation with the intelligent network, reroutes the transmission channel of the second terminal to an Protocol (IP) for transmission of the indicator datum to the second terminal;
    wherein at least one of an acoustical data and an optical data is at least one of stored and transmitted as the indicator datum;
    wherein, upon initiating a call set-up between the first terminal and at least one additional terminal;
    the intelligent network effects a comparison of at least one identification datum of at least one additional terminal with the assigned at least one identification datum of the at least one second terminal, and,
    upon determining a match between the at least one identification datum of the at least one additional terminal and the assigned at least one identification datum of the at least one second terminal, the intelligent network effects a transmitting of the at least one stored indicator datum to the matched at least one second terminal in a form of software and adapting at least one of a hardware and a memory of the second terminal device to indicate the indicator datum,
    wherein the at least one stored indicator is activated at the at least one second terminal, wherein one of (a) the first terminal and (b) the at least one second terminal is a calling terminal and the other of (a) the first terminal and (b) the at least one second terminal is a called terminal
    wherein a data record, assignable to the first terminal is generated as a function of the indicator datum, the identification datum of at least one of the first terminal, and the identification datum of the at least one second terminal; and
    initiating a further authentication procedure in an application specific manner when the identification datum of the first terminal does not correspond to terminal identification datum stored in the first or additional database.

2. The system of dam 1, further comprising:
    one of a control unit and a logic unit cooperating with the portal to bring about at least one of the verification, adaptation and storing of the at least one of selected, assigned first and second terminals, and the indicator datum.

3. A method for providing a personalized indicator datum on at least one terminal when setting up a telecommunication or setting up a call between a first terminal and at least one second terminal, comprising:
    upon assigning, in a first database associated with an intelligent network of a telecommunication network of the first terminal, at least one identification datum of the at least one second terminal to an identification datum of the first terminal, storing at least one indicator datum in the first or an additional database associated with the intelligent network of the telecommunication network of the first terminal, wherein the at least one indicator datum is previously selected by the first terminal, in the first database, assigning the identification datum of the at least one second terminal as the identification datum of a called terminal to the identification datum of the first terminal as a calling terminal; and storing the at least one indicator datum as the function of the assignment as the indicator datum for the second terminal as the called terminal, in the first database, assigning the identification datum of the at least one second terminal as the identification datum of the calling terminal to the identification datum of the first terminal as the called terminal; and storing the at least one indicator datum as the function of the assignment as the indicator datum for the second terminal as the calling terminal, as the function of the assignment, setting a trigger detection point for a basic connection of the first terminal, wherein in response to the set trigger detection point, an exchange unit of the telecommunication network reroutes a transmission channel of the second terminal for the transmission of the indicator datum to the second terminal to an intelligent periphery of the intelligent network cooperating with the database in which the indicator datum is stored;

the intelligent periphery cooperating with the intelligent network, and an exchange unit, which responds to a set Telocator Data Protocol (TDP) and, in cooperation with the intelligent network, reroutes the transmission channel of the second terminal to an Internet Protocol (IP) for transmission of the indicator datum to the second terminal;

wherein a user interface connected to the intelligent network is implemented to at least one of the assignment of the first and second terminals and for the selection of indicator datum;

wherein access to an application portal for assignment and selection of the first and second terminals and the indicator datum is provided via the user interface;

wherein at least one of an acoustical data and an optical data is at least one of stored and transmitted as the indicator datum;

wherein, upon initiating a call set-up between the first terminal and at least one additional terminal;

comparing, with the intelligent network of the telecommunication network of the first terminal, the at least one identification datum of the at least one additional terminal with the assigned at least one identification datum of the at least one second terminal;

upon determining a match between the at least one identification datum of the at least one additional terminal and the assigned at least one assigned identification datum of the at least one second terminal transmitting, with the intelligent network of the telecommunication network of the first terminal, the at least one stored indicator datum to the matched at least one second terminal in a form of software and adapting at least one of a hardware and a memory of the second terminal device to indicate the indicator datum, and activating the at least one stored indicator datum at the at least one second terminal, wherein one of (a) the first terminal and (b) the at least one second terminal is a calling terminal and the other of (a) the first terminal and (b) the at least one second terminal is a called terminal;

wherein a data record, assignable to the first terminal is generated as a function of the indicator datum, the identification datum of at least one of the first terminal, and the identification datum of the at least one second terminal;

and initiating a further authentication procedure in an application specific manner when the identification datum of the first terminal does not correspond to terminal identification datum stored in the first or additional database.

4. The method of claim 3, wherein the indicator datum, prior to being the at least one of stored and transmitted, is at least one of converted and encoded by the intelligent network as the function of the respective second terminal.

5. The method of claim 3, wherein at least one of an identification and an authentication with respect to the first terminal is implemented prior to the storing of the identification datum and the indicator datum.

* * * * *